United States Patent Office 2,915,471
Patented Dec. 1, 1959

2,915,471

LUBRICATING OIL COMPOSITIONS

Lyman E. Lorensen, Berkeley, Calif., assignor to Shell Development Company, New York, N.Y., a corporation of Delaware No Drawing. Application April 16, 1956
Serial No. 578,168

11 Claims. (Cl. 252—51.5)

This invention relates to lubricants, and more particularly to lubricating oils containing additives which improve the viscosity index or viscosity-temperature properties of the oil, and, at the same time, act as pour point depressing agents.

Lubricating oils should possess little variation in viscosity over relatively wide temperature ranges; in other words, they should possess good viscosity-temperature characteristics. Lubricating oils which lack this property tend to thicken at low temperatures, thereby forming a relatively viscous composition having poor flow characteristics; this impedes starting of engines, increases power consumption, and causes wear of the moving parts of the engine. Oils which tend to thin out at elevated temperatures provide insufficient lubricity or oiliness for efficient lubrication. A variety of viscosity index improvers has been developed to overcome this defect in lubricating oils. Some of the best known materials of this type are sold commercially under the trade names of "Paratone," "Santodex" and "Acryloid." The first two types are hydrocarbon polymers, exemplified by polybutenes and polymers containing alkyl and aryl radicals, e.g. products obtained by condensation of alkyl halides with aromatic hydrocarbons specifically, condensation products of chlorinated wax with naphthalenes or copolymers of styrene with olefins of from 2 to 12 carbon atoms.

The oxygen-containing polymers include the "Acryloids" which are polymers and copolymers of esters of acrylic acid, such as copolymers of octyl and lauryl methacrylate; polymers of vinyl esters, such as copolymers of vinyl stearate and vinyl laurates and the like. Another class of polymers are the nitrogen-containing polymers, such as copolymers of vinyl pyridines with acrylates or copolymers of vinyl pyrrolidones with acrylates. These nitrogen-containing polymers are exemplified by copolymers of 2-methyl-5-vinyl pyridine/lauryl methacrylate, 2-methyl-5-vinyl pyridine/octadecyl methacrylate, N-vinyl pyrrolidone/lauryl methacrylate, N-vinyl pyrrolidone/octadecyl methacrylate and terpolymer of lauryl methacrylate/octadecyl methacrylate/2 - methyl - 5 - vinyl pyridine. The molecular weight of these polymers can vary over a wide range, namely, from 10,000 and above for hydrocarbon and oxygen-containing polymers and preferably from about $10 \times 10^3$ to about $10 \times 10^5$. On the other hand nitrogen-containing polymers are most effective as viscosity index improvers when they are in a molecular weight range of from $7.5 \times 10^3$ to $2.5 \times 10^6$ and preferably when they range in molecular weight from $2 \times 10^5$ to $1 \times 10^6$.

To improve the effectiveness of the above polymers various means have been proposed, such as by combining polymeric viscosity index improvers with non-solvent modifiers preferably oxyesters e.g. dibutoxyethyl phthalate which act to decrease thickening and at the same time improve viscosity-temperature characteristics of polymer thickened oils. Another method used is to combine viscosity index improvers and dispersing agents, such as soaps exemplified by aluminum soaps. These methods of obtaining viscosity-temperature improvement are objectionable because: (1) large amounts of additive modifiers are usually required, (2) when soaps are used, they cause foaming, and (3) the stability of the oil composition is impaired when such additives are incorporated.

It has now been discovered that the effectiveness of acrylic acid ester polymeric viscosity index improvers is substantially improved, without imparting thereto any detrimental secondary effect, by addition to oils containing acrylic acid ester polymeric viscosity index improvers, of a minor amount of from about 0.1% to about 10% and preferably from about 1% to about 5% of fluorine-containing organic compounds, such as fluorocarbons or fluorinated oxygen or nitrogen-containing organic compounds. By fluorocarbon is meant a material containing carbon, hydrogen and fluorine, or only carbon and fluorine, in the molecule and it may be aliphatic, cycloaliphatic or aromatic in character. Other fluorine-containing organic compounds suitable for use in lubricating oil compositions of this invention, include fluorochemicals described by Brice et al. in Chemical and Engineering News, February 9, 1953, pages 510–513, in an article entitled "Fluorochemicals—Today and Tomorrow," and those described by Fowler et al. in Industrial and Engineering Chemistry, March 1947 (vol. 39, No. 3, pages 292 and 319), and include fluorinated aliphatic, cycloaliphatic and aromatic hydrocarbons, fluorinated oxygen- and nitrogen-containing compounds, such as fluorine-containing amines, ethers, acids, alcohols and esters. Examples of these compounds include fluorocarbons, such as fluorinated kerosene, lube oil or fractions thereof, fluoro olefins, such as polymers of trifluorovinyl chloride, hepta-, octa- and dodecafluoropentane, and derivatives of such hydrocarbons having from 5 to 50 carbon atoms in which all or part of the hydrogen atoms are replaced with fluorine atoms; fluorine-containing alicyclic hydrocarbons, such as are described in U.S. Patents 2,540,088 and 2,549,580; fluorinated-aromatic compounds, such as fluorobenzene, fluoronaphthalene, fluorodiphenyl, fluorotoluene; ethers, such as fluorine-containing alkyl ethers, e.g. diperfluorobutyl ether, fluorinated cyclic ether, such as "Fluorochemical 0-75" ($C_8F_{16}O$) made by Minnesota Mining and Manufacturing Co.; acids and their derivatives, such as described in U.S. Patent 2,715,107 and including fluorinated fatty acids, e.g., perfluoroacetic acid, perfluoropropionic acid, perfluorooctanoic acid and their amide and ester derivatives; amines, such as perfluoroalkylamines e.g. triperfluorobutylamine, heptacosafluorotributylamine, as well as miscellaneous compounds trifluoromethyl acrylonitrile, vinyl trifluoroacetate, perfluorobutyl acrylates and mixtures of the above fluorine-containing compounds.

These fluorine-containing organic compounds function as convolution modifiers. By convolution modifier is meant a material capable of modifying the extent of coiling of the polymeric viscosity index improvers with temperature changes, so as to allow the polymers to exert their maximum benefits on the oil in which they are present. These fluorine-containing compounds (convolution modifiers) can be present either as an integral part of the polymer viscosity index improver or they can be present as secondary additives. When these convolution modifiers are used as secondary additives, they can be present in amounts ranging from about 0.01% to about 5% and preferably from about 0.5% to about 2% by weight based on the total composition. When the convolution modifiers are used as an integral portion of the viscinity index polymer it normally comprises from 1% to 5% of the weight of the molecular weight of the polymer. In forming such materials the fluorine-containing compounds should be so selected as to be capable of being polymerized with the polymer it is to modify. Examples of such fluorine-containing compounds are illustrated by trifluorovinyl chloride, trifluoromethylacrylonitrile, vinyl trifluoro acetate, perfluorobutyl acrylate and the like. Compounds of this type can be readily polymerized with vinyl pyridines/methacrylates monomers, or vinyl pyrrolidones/methacrylates monomers, to form polymers of high molecular weight of from $1.5 \times 10^3$ to $2 \times 10^6$ in which the fluorine-containing monomer units are less than 5% by weight of the total molecular weight of the terpolymer. Examples of such terpolymers include vinyl pyridine/lauryl methacrylate/vinyl trifluoroacetate, 2-methyl-5-vinyl pyridine/octadecyl methacrylate/trifluorovinyl chloride; N-vinyl pyrrolidone/octadecyl methacrylate/trifluorovinyl chloride, trifluoromethyl acrylonitrile/vinyl stearate and the like.

The hydrocarbon oils which are effectively improved by additives of this invention include those derived from paraffinic, naphthenic, asphaltic or mixed base crude petroleum stocks, suitably refined and can range in viscosity or boiling point from the gas oil to the heavy lube oil viscosity or boiling range.

The effectiveness of the convolution modifiers to improve the viscosity-temperature characteristics of mineral oils containing viscosity index improvers is demonstrated from the data presented below. The R value is equal to vis. at 100° F./vis. at 210° F. as determined by the standard ASTM method. A decrease in R value denotes improvement in viscosity-temperature characteristics.

EXAMPLE I

The effect of various fluoro-compounds on the viscosity-temperature coefficient (R) of a refined mineral lubricating oil containing one percent of a 2:1 lauryl methacrylate/N-vinyl pyrrolidone copolymer (M.W. 300,000), was determined by the standard ASTM method. A decrease in R value denotes improvement in the viscosity-temperature characteristic of the composition. The results are given in Table I.

Table I

| Compositions | Percent Wt. Additive | R Value |
|---|---|---|
| A. Mineral Lubricating Oil | None | 5.00 |
| B. A + copolymers of lauryl methacrylate/N-vinyl pyrrolidone. | 1.0 | 4.90 |
| C. B + fluorobenzene | 1.0 | 4.75 |
| D. B + perfluoromethyl cyclohexane | 1.0 | 4.84 |
| E. B + 4-fluorobiphenyl | 1.0 | 4.82 |
| F. B + fluorinated cyclic ether ($C_8F_{16}O$) | 1.0 | 4.83 |
| G. B + heptacosafluorotributylamine | 1.0 | 4.85 |
| H. B + diiodopentane | 1.0 | 5.00 |
| I. B + diiodobenzene | 1.0 | 4.99 |
| J. B + chloro wax | 1.0 | 4.97 |
| K. B + glycerol monooleate | 1.0 | 4.96 |

EXAMPLE II

The interaction of fluoro-organic compounds with methacrylate polymer viscosity index improvers to give still greater improvement in the viscosity-temperature properties of a mineral lubricating oil was determined as in Example I. The comparative results for a refined mineral lubricating oil containing one percent of "Acryloid 710," a produce marketed by Rohm and Haas Co., and which is a copolymer of a mixture of lauryl and octyl methacrylates and has an average molecular weight of 10,000 to 20,000 (ebullioscopic method), with and without a representative fluoro-compound, are given in Table II.

Table II

| Compositions | Percent Wt. Additive | R Value |
|---|---|---|
| A. Mineral Lubricating Oil | None | 5.00 |
| B. A + "Acryloid 710" | 1.0 | 4.85 |
| C. B + fluorobenzene | 1.0 | 4.73 |

EXAMPLE III

The interaction of fluoro-organic compounds with methacrylate polymer viscosity index improvers to give still greater improvement in the viscosity-temperature properties of a mineral lubricating oil was determined as in Example I. The comparative results for a refined mineral lubricating oil containing one percent of octadecyl methacrylate/2-methyl-5-vinyl pyridine 4/1 mole ratio and having a molecular weight of 163,000, with and without a representative fluoro-compound, are given in Table III.

Table III

| Compositions | Percent Wt. Additive | R Value |
|---|---|---|
| A. Mineral Lubricating Oil | None | 5.00 |
| B. A + copolymer of octadecyl methacrylate/2-methyl-5-vinyl pyridine | 1.0 | 4.76 |
| C. B + fluorobenzene | 1.0 | 4.76 |
| D. B + fluorinated cyclic ether ($C_8F_{16}O$) | 1.0 | 4.61 |
| E. B + 1,4-dichlorobutane | 1.0 | 4.68 |
|  |  | 4.91 |

The compositions of this invention as noted in Examples I, II and III and containing the fluorocompounds as noted in Table I, II and III increase the viscosity index of the base oil from 64 to from about 120 to about 145, depress the pour point of the base oil from around +20° F., to from −10° F. to −20° F.

Compositions of this invention may contain minor amounts (0.01–2%) of corrosion inhibitors, e.g., inorganic and organic nitrites, such as $NaNO_2$ or $LiNO_2$ and diisopropylammonium e.g., Ca or Zn dicyclohexyl thiophosphate or methylcyclohexyl thiophosphate; of extreme pressure agents, such as organic phosphites, phosphates and phosphonates, e.g., trichloroethyl phosphite, tricresyl phosphate, dilorol phosphate, phosphorus sulfide-olefin reaction products, such as $P_2S_5$-terpene reaction products, organic sulfides, e.g., wax disulfide, ethylene bistolyl sulfide; of anti-oxidants, such as amines and phenols, e.g., octadecylamine, phenyl-α-naphthylamine, 2,6-diterbutyl-4-methylphenol and other oil additives, such as metal phenates, metal sulfonates e.g., alkaline earth metal salts of alkyl phenols and/or petroleum sulfonic acid exemplified by calcium or barium salt of octyl phenol-formaldehyde condensation product or the neutral or basic calcium and barium petroleum sulfonates.

I claim as my invention:

1. A mineral lubricating oil containing from about 0.1% to about 10% of an acrylic acid ester polymeric thickener, said thickener having molecular weights within the range from $1 \times 10^4$ to $1 \times 10^6$ and from about 0.1% to about 5% of an oil-soluble fluorine-containing organic compound selected from the group consisting of fluorine-containing aromatic hydrocarbon, fluorine-containing cyclic ether and fluorine-containing alkylamine.

2. The composition of claim 1 wherein the thickener is a methacrylate thickener wherein the methacrylate is an ester of long chain fatty acids and methacrylic acid.

3. The composition of claim 1 wherein the thickener is a copolymer of a methacrylate ester and a nitrogen-containing compound selected from the group consisting of vinyl pyridines and vinyl pyrrolidones, said copolymer having molecular weights within the range between $2 \times 10^5$ and $1 \times 10^6$.

4. A mineral lubricating oil containing from about 0.1% to about 10% of a copolymer of vinyl pyridine and an alkyl methacrylate, the alkyl radical having from 8 to 20 carbon atoms, said copolymer having molecular weights within the range between $2 \times 10^5$ and $1 \times 10^6$, and from about 0.1 to about 5% of a fluorine-containing aromatic hydrocarbon.

5. A mineral lubricating oil containing from about 0.1% to about 10% of a copolymer of vinyl pyrrolidone and an alkyl methacrylate, the alkyl radical having from 8 to 20 carbon atoms, said copolymer having molecular weights within the range between $2 \times 10^5$ and $1 \times 10^6$, and from about 0.1% to about 5% of a fluorine-containing aromatic hydrocarbon.

6. A mineral lubricating oil containing from about 0.1% to about 10% of a polymer of an alkyl methacrylate, the alkyl radical having from 8 to 20 carbon atoms, said polymer having molecular weights within the range between $1 \times 10^4$ and $10 \times 10^5$, and from about 0.1% to about 5% of a fluorine-containing aromatic hydrocarbon.

7. A mineral lubricating oil containing from about 0.1 to about 10% of a copolymer of vinyl pyridine and an alkyl methacrylate, the alkyl radical having from 8 to 20 carbon atoms, said copolymer having molecular weights within the range between $2 \times 10^5$ and $1 \times 10^6$, and from about 0.1% to about 5% of a fluorine-containing cyclic ether.

8. A mineral lubricating oil containing from about 0.1% to 10% of a copolymer of vinyl pyridine and an alkyl methacrylate, the alkyl radical having from 8 to 20 carbon atoms, said copolymer having molecular weights within the range between $2 \times 10^5$ and $1 \times 10^6$ and from about 0.1% to about 5% of a fluorine-containing alkyl-amine.

9. A mineral lubricating oil containing about 1% each of a copolymer of octadecyl methacrylate/2-methyl-5-vinyl pyridine, said copolymer having molecular weights within the range between $2 \times 10^5$ and $1 \times 10^6$ and fluorobenzene.

10. A mineral lubricating oil containing about 1% each of a copolymer of octyl and lauryl methacrylate, said copolymer having molecular weights within the range between $1 \times 10^4$ and $10 \times 10^5$ and fluorobenzene.

11. A mineral lubricating oil containing about 1% each of a copolymer of octadecyl methacrylate/N-vinyl pyrrolidone, said copolymer having molecular weights within the range between $2 \times 10^5$ and $1 \times 10^6$ and fluorobenzene.

References Cited in the file of this patent

UNITED STATES PATENTS

| | | |
|---|---|---|
| 2,291,166 | Maag | July 28, 1942 |
| 2,411,159 | Hanford | Nov. 19, 1946 |
| 2,435,206 | Davis et al. | Feb. 3, 1948 |
| 2,515,115 | Davis et al. | July 11, 1950 |
| 2,583,588 | Mosteller | Jan. 29, 1952 |
| 2,628,196 | Coonradt et al. | Feb. 10, 1953 |
| 2,680,717 | Little | June 8, 1954 |
| 2,715,107 | Talley et al. | Aug. 9, 1955 |
| 2,737,496 | Catlin | Mar. 6, 1956 |